Jan. 29, 1924.   1,482,017
J. P. LEGGETT
AUTOMOBILE PROPELLING MECHANISM
Original Filed Nov. 12, 1921   3 Sheets-Sheet 3

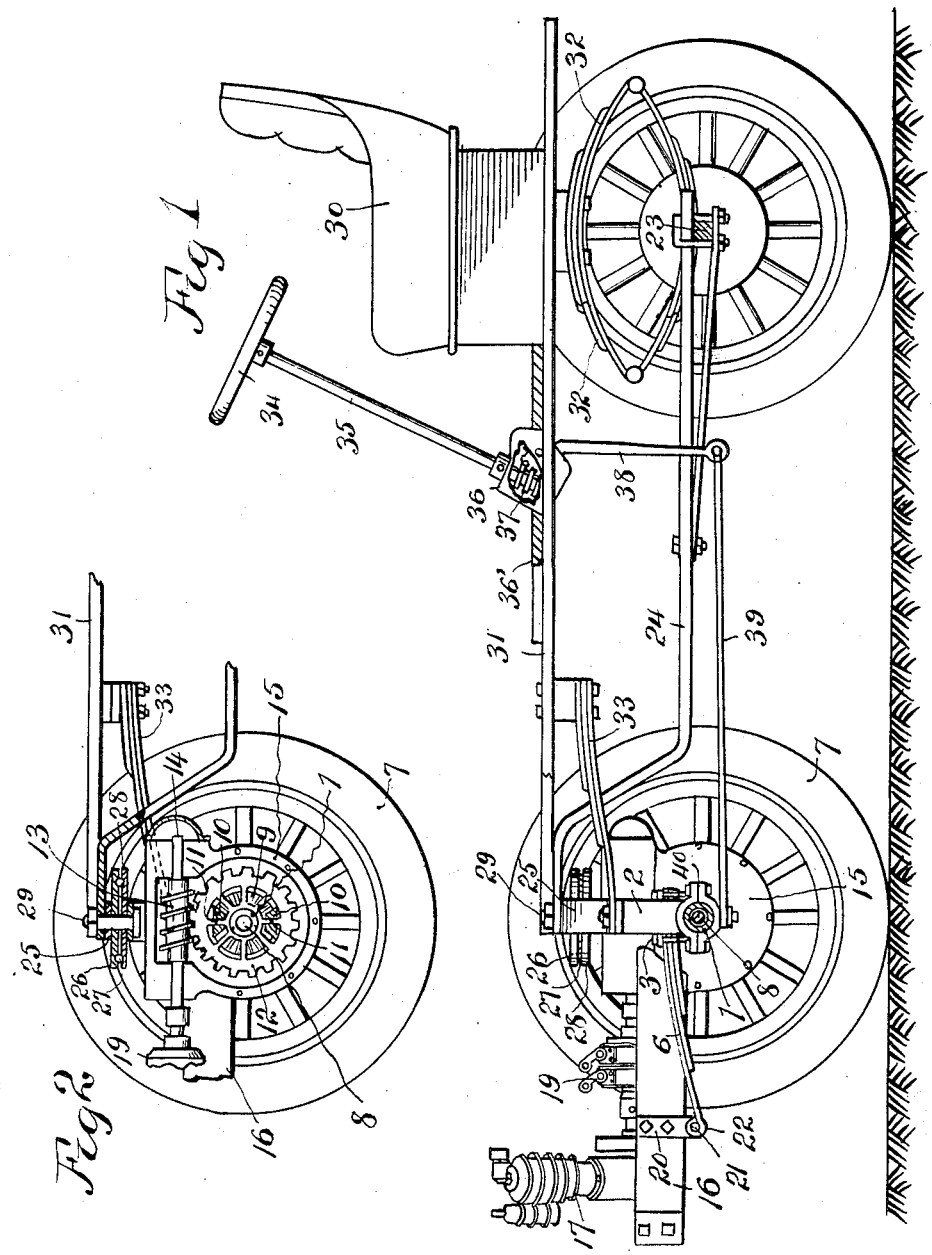

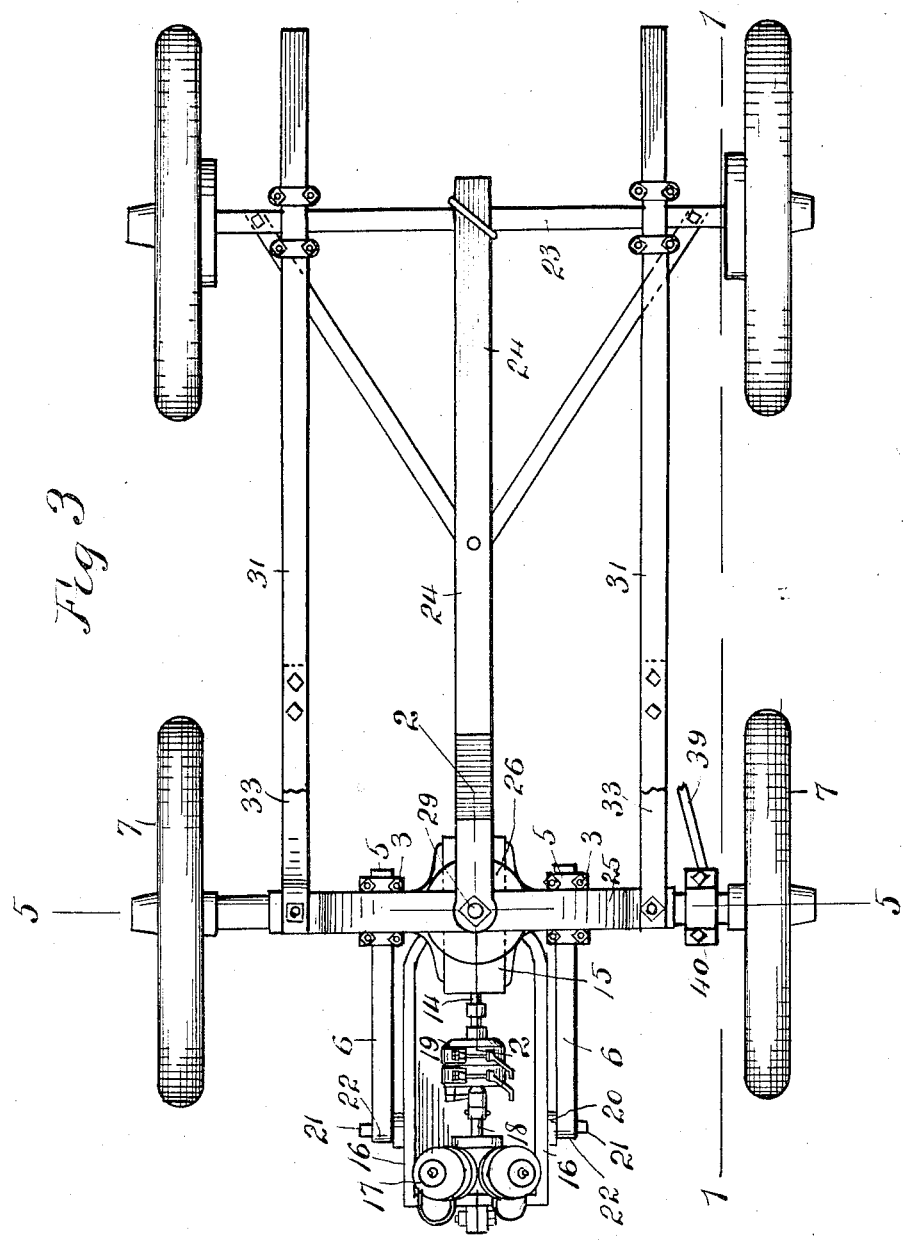

Patented Jan. 29, 1924.

1,482,017

UNITED STATES PATENT OFFICE.

JOSEPH P. LEGGETT, DECEASED, LATE OF CARTHAGE, MISSOURI, BY IDA M. LEGGETT, ADMINISTRATRIX, OF CARTHAGE, MISSOURI.

AUTOMOBILE PROPELLING MECHANISM.

Application filed November 12, 1921, Serial No. 514,462. Renewed December 5, 1923.

*To all whom it may concern:*

Be it known that JOSEPH P. LEGGETT, deceased, late a citizen of the United States, and late a resident of Carthage, in the county of Jasper and State of Missouri, has invented new and useful Improvements in Automobile Propelling Mechanisms, of which the following is a specification.

This invention relates to improvements in automobile propelling mechanisms.

It relates particularly to an automobile of the front wheel drive type.

One of the objects of the invention is to provide novel propelling mechanism of the kind described, which is simple, cheap to make, durable, not liable to get out of order, which is relatively light, which is not liable to skid, which may be easily steered, which affords a maximum of traction power, and in which the weight of the motor is employed to assist the driving wheels to climb over an obstruction or to hold them back when they enter depressions in the road.

The invention provides further novel transmission means between the engine and the differential mechanism and by means of which the weight of the engine effects a prying action upon the differential driving gear, when the engine moves vertically with relation to the front axle.

The invention provides still further a novel support for the engine, or motor which includes as a part thereof the housing for the differential driving mechanism.

The invention provides still further novel resilient means by which the whole support of the engine is located forward of the front axle.

The novel features of the invention are hereinafter fully described and claimed.

In the accompanying drawings, which illustrate the preferred embodiment of the invention, Fig. 1 is a longitudinal vertical sectional view, partly broken away, on the line 1—1 of Fig. 3, of an automobile provided with the improved propelling mechanism.

Fig. 2 is a vertical sectional view on the line 2—2 of Fig. 3.

Fig. 3 is a plan view, partly broken away, and some of the parts being removed, of what is shown in Fig. 1.

Fig. 4 is a front elevation of the machine, some of the parts being removed.

Fig. 5 is a vertical sectional view on the line 5—5 of Fig. 3.

Similar reference characters designate similar parts in the different views.

The front axle comprises two horizontal tubular members 1, which are respectively rigidly secured to the arms of an inverted U-shaped yoke 2, by means of U-bolts 3, which engage plates 4, that bear against the under side of the axle and which extend through clamping plates 5, which bear upon the upper sides and rear ends of forwardly extending leaf springs 6, which rest upon the arms of the yoke 2, the latter being mounted upon the upper sides respectively of the axle members 1.

Respectively rotatably mounted on the outer ends of the front axle members 1, are the front carrying wheels 7 of the automobile.

The differential driving mechanism comprises the usual driving shafts 8 mounted in the members 1 and respectively rigidly secured to the wheels 7. Respectively secured to the shaft 8 are the usual bevel gear wheels 9 which mesh with bevel gear wheels 10 rotatable on spokes 11 respectively with which the driving gear wheel 12 of the differential is provided, Fig. 2. The gear wheel 12 is preferably a worm wheel which meshes with a gear 13, preferably comprising a worm gear, which is mounted on and rotatable with a horizontal longitudinal shaft 14, Fig. 2.

The shaft 14 is rotatably mounted in a differential housing 15, which comprises two side members bolted together and which are respectively pivoted on a horizontal transverse axis on the axle members 1, intermediate of the arms of the yoke 2.

The differential housing 15 forms the rear part of a supporting frame, the front part of which consists of two side members 16, which are bolted together and on which is mounted a motor of any suitable type, such as an explosive engine 17, which is provided with a horizontal longitudinal shaft 18, the rear end of which is operatively connected with any well known type of change speed transmission gearing 19, which in turn is operatively connected to and adapted to drive the shaft 14.

The members 16 of the motor frame have respectively rigidly secured to them two hangers 20, each having an outwardly extending stud 21, which is pivotally mounted in the loop 22, provided in the forward end of the adjacent spring 6. It will thus be seen that the springs 6 support the motor frame at a point forward of the front axle.

By means of the construction described, any relative downward movement of the motor frame, as when the wheels 7 ride over an obstruction, a prying effect would be exerted by the weight of the engine and its supporting frame on the gear wheel 12, through the intermediacy of the worm 13, and shaft 14, which will tend to turn the gear wheel 12 forwardly, whereby the weight of the engine will assist the front driving wheels 7 in rising over the obstruction. The opposite effect will be produced when the wheels 7 drop into a depression.

23 designates the rear axle of the machine, to which is rigidly secured the rear end of a reach 24, which rests at its forward end upon a transverse bow-shaped plate 25, mounted on an upper bearing member 26, Fig. 5, which is supported upon balls 27 which are mounted on a bearing member 28, which rests on the yoke 2. A king bolt 29 extends through the reach 24, plate 25, members 26 and 28 and the yoke 2.

For supporting a seat 30, there may be provided two longitudinal bars 31 which are supported on elliptical springs 32 mounted on the rear axle 23. The bars 31 are respectively supported near their front ends on leaf springs 33 the front ends of which are supported on the plate 25 respectively adjacent to the ends thereof.

Any suitable steering means may be employed, as for example, a steering wheel 34 may be attached to the upper end of a steering shaft 35, the lower end of which is rotatably mounted in a housing 36 mounted on a platform 36', which is supported on the bars 31 forward of the seat 30. Secured to the shaft 35 is a worm gear 37 which meshes with the toothed upper portion of a lever 38 pivoted to the housing 36 and having attached to its lower end a bar 39 the front end of which is attached to a boxing 40 secured to one of the axle members 1 adjacent to one of the wheels 7.

In the operation of the invention, when the motor 17 is run and the rotation of the shaft 18 is transmitted to the shaft 14 through the transmission gearing 19, the worm gear 13 will turn the gear wheel 12 of the differential mechanism, thereby driving the shafts 8 and front driving wheels 7. If the wheels 7, in the forward movement of the machine, run over an obstruction, the wheels 7 and axle 1—2 will rise, while the engine and frame supporting it, being heavy will not rise so quickly, whereupon the swinging of the motor frame on the axle will cause the worm gear 13 to exert a prying effect on the gear wheel 12 tending to turn the latter counter-clockwise, as viewed in Figs. 1 and 2, thus assisting the wheels 7 to surmount the obstruction. The reverse of this operation will be occasioned by the wheels 7 dropping into a depression in the road.

The invention is not limited to the structure shown and described, as many modifications, within the scope of the appended claims, may be made without departing from the spirit of the invention.

What I claim is:—

1. In an automobile propelling mechanism, the combination with a front axle and carrying wheels supporting the axle, of a motor frame pivoted on a horizontal transverse axis on said axle, vertically resilient means supported by the axle and upon which the frame is supported at a point forward of the axle, a motor carried by the frame forward of the axle, and means actuated by the motor for driving said carrying wheels, substantially as set forth.

2. In an automobile propelling mechanism, the combination with a front axle and carrying wheels supporting the axle, of a motor frame pivoted on a horizontal transverse axis to said axle, vertically resilient means supported by the axle and upon which the frame is supported at a point forward of the axle, a motor carried by the frame forward of the axle, and means including differential driving mechanism actuated by said motor for driving said carrying wheels, substantially as set forth.

3. In an automobile propelling mechanism, the combination with a front axle and carrying wheels supporting the axle, of a motor frame pivoted on a horizontal transverse axis to said axle, one or more springs supported at their rear ends upon said axle and extending forwardly therefrom and at their forward ends supporting said frame, a motor carried by the frame forward of the axle, and means actuated by the motor for driving said carrying wheels, substantially as set forth.

4. In an automobile propelling mechanism, the combination with a front axle and carrying wheels supporting the axle of a motor frame pivoted on a horizontal transverse axis to said axle, one or more springs supported at their rear ends on said axle and at a point forward of the axle supporting said frame, a motor carried by the frame forward of the axle, and means including differential driving mechanism actuated by said motor for driving said carrying wheels, substantially as set forth.

5. In an automobile propelling mechanism, the combination with a front axle and carrying wheels supporting the axle, of a motor frame pivoted on a horizontal transverse axis to said axle, vertically resilient means supported by the axle and upon which the frame is supported at a point forward of the axle, a motor carried by the frame forward of the axle and having a horizontal longitudinal driving shaft, and means actuated by said driving shaft for driving said carrying wheels, substantially as set forth.

6. In an automobile propelling mechanism, the combination with a front axle and carrying wheels supporting the axle, of a motor frame pivoted on a horizontal transverse axis to said axle, vertically resilient means supported by the axle and upon which the frame is supported at a point forward of the axle, a motor carried by the frame forward of the axle having a horizontal longitudinal driving shaft, and means including differential driving mechanism actuated by said driving shaft for driving said carrying wheels, substantially as set forth.

7. In an automobile propelling mechanism, the combination with a front axle and carrying wheels supporting the axle, of a motor frame pivoted on a horizontal transverse axis to said axle, vertically resilient means supported by the axle and upon which the frame is supported, a motor carried by the frame forward of the axle having a horizontal longitudinal driving shaft, and means including change speed transmission gearing actuated by said driving shaft for driving said carrying wheels, substantially as set forth.

8. In an automobile propelling mechanism, the combination with a front axle and carrying wheels supporting the axle, of a motor frame pivoted on a horizontal transverse axis to said axle, vertically resilient means supported by the axle and on which the frame is supported, a motor carried by the frame forward of the axle having a horizontal longitudinal driving shaft, change speed transmission gearing actuated by said driving shaft, and means including differential driving mechanism actuated by said gearing for driving said carrying wheels, substantially as set forth.

9. In an automobile propelling mechanism, the combination with a front axle and carrying wheels supporting the axle, of a motor frame pivoted on a horizontal transverse axis to said axle, vertically resilient means supported by the axle and supporting said frame, a motor carried by the frame forward of the axle having a horizontal longitudinal driving shaft, differential driving mechanism including a driving wheel for driving said carrying wheels, and means actuated by said driving shaft for driving said driving wheel and arranged to exert a prying effect upon the driving wheel when the frame swings on the axle, substantially as set forth.

10. In an automobile propelling mechanism, the combination with a front axle and carrying wheels supporting the axle, of a motor frame pivoted on a horizontal transverse axis to said axle, vertically resilient means supported by the axle and supporting said frame, differential driving mechanism including a driving gear wheel for driving said carrying wheels, a longitudinal horizontal shaft rotatable in said frame, a gear mounted on and rotatable with said shaft and meshing with said driving gear wheel and arranged to exert a prying effect thereupon when the frame swings on the axle, and means actuated by said motor for rotating said shaft, substantially as set forth.

11. In an automobile propelling mechanism, the combination with a front axle and carrying wheels supporting the axle, of a motor frame pivoted on a horizontal transverse axis to said axle, vertically resilient means supported by the axle and supporting said frame, a motor carried by the frame forward of the axle having a horizontal longitudinal driving shaft, differential driving mechanism including a driving gear wheel for driving said carrying wheels, a second horizontal longitudinal driving shaft rotatable in said frame, a gear mounted on and rotatable with said second shaft and meshing with said driving gear wheel, and change speed transmission gearing connecting said shafts, substantially as set forth.

12. In an automobile propelling mechanism, the combination with a front axle and carrying wheels supporting the axle, of a motor frame pivoted on a horizontal transverse axis to said axle, one or more springs secured to and supported at their rear ends by said axle and supporting said frame at a point forward of the axle, a motor carried by said frame forward of the axle, means including differential driving mechanism having a driving gear wheel for driving said carrying wheels, a horizontal longitudinal shaft rotatable on said frame, a gear mounted on and rotatable with said shaft and meshing with said driving gear wheel, and means actuated by said motor for rotating said shaft, substantially as set forth.

13. In an automobile propelling mechanism, the combination with a front axle and carrying wheels supporting the axle, of a motor frame pivoted on a horizontal transverse axis to said axle, one or more forwardly extending springs secured to and supported at their rear ends by said axle and upon which said frame bears at a point forward of the axle, a motor carried by the frame forward of the axle having a longitudinal horizontal driving shaft, a second horizontal longitudinal shaft rotatable in said frame, change speed transmission gearing connecting said shaft, means including differential driving mechanism having a driving gear wheel for driving said carrying wheels, and a gear mounted on and rotatable with said second shaft and meshing with said driving gear wheel and arranged to exert a prying effect thereupon when the frame swings on the axle, substantially as set forth.

14. In an automobile propelling mechanism, the combination with a front axle and carrying wheels supporting the axle, of a motor frame pivoted on a horizontal transverse axis to said axle, one or more forwardly extending springs secured to and supported at their rear ends by said axle and upon which said frame bears at a point forward of the axle, a motor carried by said frame, a horizontal longitudinal shaft rotatable in said frame, means actuated by the motor for rotating said shaft, means including differential driving mechanism having a driving gear wheel for driving said carrying wheels, and a worm gear secured to and rotatable with said shaft and meshing with said driving gear wheel, substantially as set forth.

15. In an automobile propelling mechanism, the combination with a front axle and carrying wheels supporting the axle, of a motor frame pivoted on a horizontal transverse axis to said axle, one or more forwardly extending springs secured to and supported at their rear ends by said axle and upon which said frame bears at a point forward of the axle, a motor carried by said frame forward of the axle having a longitudinal horizontal driving shaft, a second horizontal longitudinal shaft rotatable in said frame, change speed transmission gearing connecting said shafts, means including differential driving mechanism having a driving gear wheel for driving said carrying wheels, and a worm gear secured to and rotatable with said second shaft and meshing with said driving gear wheel and arranged to exert a prying effect thereupon when the frame swings on the axle, substantially as set forth.

16. In an automobile propelling mechanism, the combination with a front axle and carrying wheels supporting the axle, of a motor frame including differential housing pivoted on a horizontal transverse axis on said axle, one or more forwardly extending springs secured at their rear ends to and supported by said axle and on which the frame bears at a point forward of the axle, a motor carried by the frame forward of the axle, differential gearing mechanism mounted in said housing for driving said carrying wheels, and means actuated by said motor for driving said differential gearing mechanism and arranged to exert a prying effect on said mechanism when the frame swings on the axle, substantially as set forth.

17. In an automobile propelling mechanism, the combination with a front axle and carrying wheels supporting the axle, of a motor frame including a differential housing pivoted on a horizontal transverse axle on said axle, one or more forwardly extending springs secured at their rear ends to and supported by said axle and on which the frame bears at a point forward of the axle, a motor carried by said frame forward of the axle having a longitudinal horizontal driving shaft, means including differential driving mechanism mounted in said housing and having a driving gear wheel for driving said carrying wheels, a second longitudinal horizontal shaft rotatable in said housing, driving means connecting said shafts, and a gear secured to and rotatable with said second shaft in said housing and meshing with said driving gear wheel, substantially as set forth.

18. In an automobile propelling mechanism, the combination with a front axle and carrying wheels supporting the axle, of a frame pivoted on a horizontal axis on said axle, a motor carried by the frame forward of said axle, means actuated by the motor for driving said carrying wheels, and resilient means rigidly secured to said axle and engaging said frame and arranged to resist vertical swinging of the latter, substantially as set forth.

19. In an automobile propelling mechanism, the combination with a front axle and carrying wheels supporting the axle, of a frame pivoted on a horizontal axis on said axle, a motor carried by the frame forward of the axle, and having a horizontal longitudinal driving shaft, means actuated by the motor driving shaft for driving said carrying wheels, and resilient means rigidly secured to said axle and engaging said frame and arranged to resist the vertical swinging of the latter, substantially as set forth.

In testimony whereof I have signed my name to this specification.

IDA M. LEGGETT,
*Administratrix of the estate of Joseph P. Leggett, deceased.*